United States Patent [19]
Faris

[11] Patent Number: 5,250,370
[45] Date of Patent: Oct. 5, 1993

[54] VARIABLE AREA DYNAMIC BATTERY

[76] Inventor: Sades M. Faris, 24 Pocantico River Rd., Pleasantville, N.Y. 10570

[21] Appl. No.: 921,035

[22] Filed: Jul. 23, 1992

[51] Int. Cl.$^5$ .......................................... H01M 10/04
[52] U.S. Cl. ...................................... 429/68; 429/113; 429/27
[58] Field of Search ...................... 429/68, 69, 113, 70, 429/67, 50, 27; 320/2, 5

[56] References Cited

U.S. PATENT DOCUMENTS

| | | | |
|---|---|---|---|
| 3,357,864 | 12/1967 | Huber | 429/113 |
| 3,432,354 | 3/1969 | Jost | 429/68 |
| 3,536,535 | 10/1970 | Lippincott | 429/68 |
| 3,663,298 | 5/1972 | McCoy et al. | 429/69 X |
| 3,822,149 | 7/1974 | Hale | 429/69 X |
| 4,172,927 | 10/1979 | Warszawski | 429/68 X |

*Primary Examiner*—Anthony Skapars

[57] ABSTRACT

A storage battery structure is disclosed including electrodes which are moved relative to each other during operation. The electrodes also have areas that are both different in size, with ratios that are variable. The battery structure includes a first electrode which is fixed in a container. An electrolyte material is also included in the container. A second electrode is moved past the fixed electrode in the container and battery action such as discharge occurs between proximate areas of the first and second electrodes. A third electrode may be provided in the container to recharge the second electrode as areas of the second electrode are moved past the third electrode at the same time that other areas of the second electrode are being discharged at the first electrode. Furthermore, the ratio of the third electrode area to the first electrode area is much larger than 1, resulting in a recharge time that is much faster. The improvement in recharge speed is given by that area ratio.

4 Claims, 4 Drawing Sheets

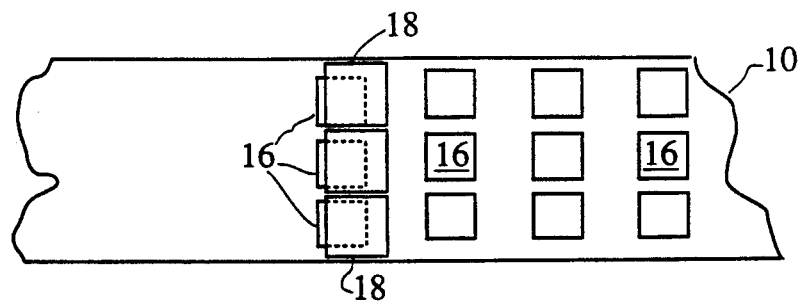
FIG 5
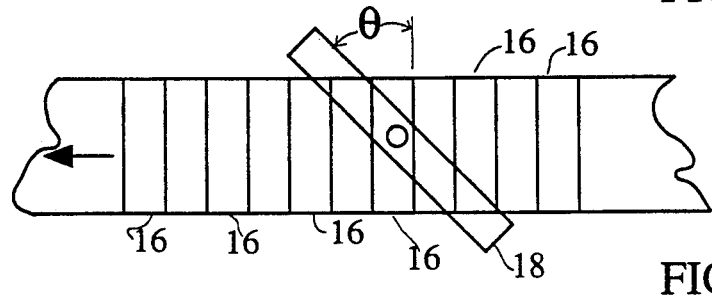
FIG 6
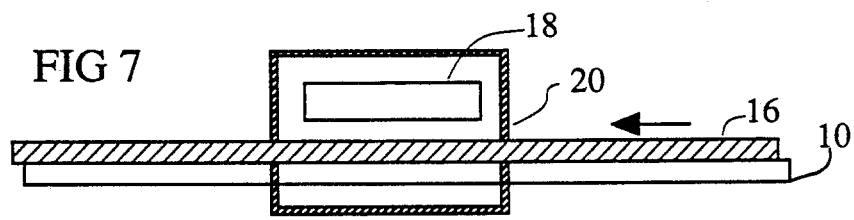
FIG 7
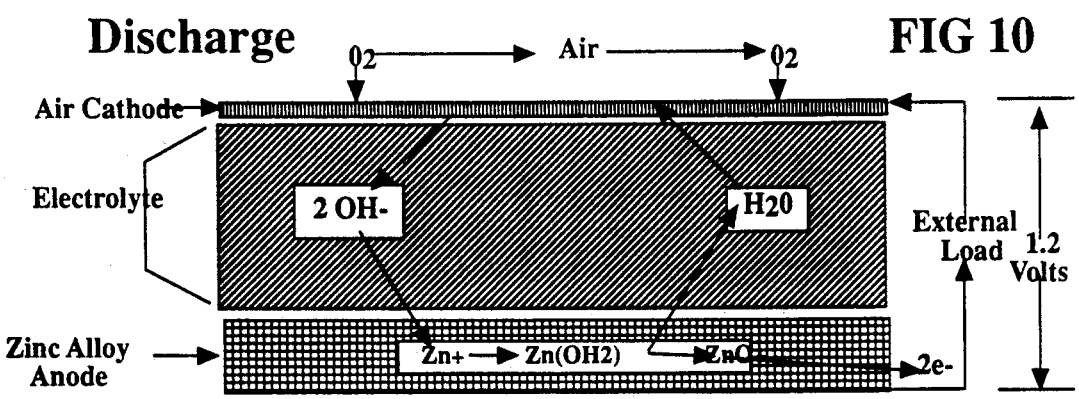
FIG 10
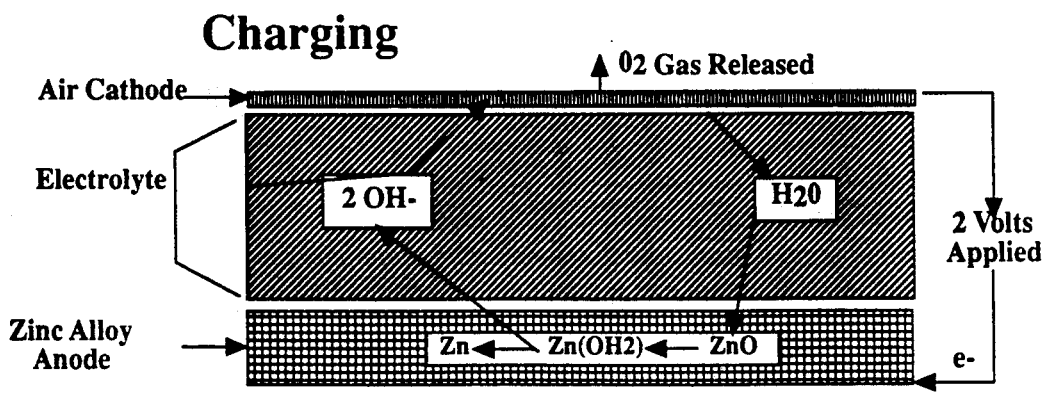

VARIABLE AREA DYNAMIC BATTERY

BACKGROUND OF THE INVENTION

1. Field of the Invention

The present invention relates to storage battery technology, and more particularly to batteries having rechargeable cells including a cathode structure, an anode structure and an electrolyte.

2. Description of the Background Art

The electrochemical storage battery is a well-known device having many applications. The storage, or secondary battery, is characterized in being capable of accepting direct-current electrical energy in a charging phase, retaining the energy in the form of chemical energy in the charge retention phase and releasing its energy on being connected to an external load in the discharge phase. The storage battery is capable of repeatedly performing these three phases over a reasonable life cycle.

The structure of the storage battery is typically a construction including one or more identical units called cells. Each cell contains plates referred to as positive (anode) and negative (cathode) electrodes contained in an electrolyte. When a charged storage battery cell is discharged through a load, the plates and the electrolyte undergo a chemical change wherein the negative cathode loses electrons and the positive anode gains electrons thereby providing a current flow. During charging, the original conditions of the battery are restored by passing through it a current opposite to that produced during the discharge.

Advances in battery technology in the prior art have mainly resided in the types of materials employed in the structure. Early storage batteries employed lead-acid cells, and then other combinations such as nickel with iron, cadmium, zinc or hydrogen and silver-iron, zinc-bromine, zinc-chlorine were developed with increasing energy quantities per weight. Lithium battery systems are now available and structures have been proposed using a lithium anode, a polymer electrode and a composite cathode such as CuO, CuS or FeS. Cells of this type are described in the Aug. 19, 1991, Electronic Engineering Times in the publication "Batteries Slim Down For Portability" by Colin Mackay and Robert Kline, Jr. at page 52. As battery developers seek to improve energy storage capacity and energy stored per kilogram, they continue to focus on the use of materials. The development of the zinc-air battery is indicative of this research approach.

Characteristics of storage batteries in the prior art are that the component elements of the structure are in a fixed and rigid relationship with each other, and that the areas of the electrodes with respect to each other are fixed. That is, the ratio of the areas of the electrodes are determined at the time of manufacture and can not be changed. Furthermore, the position or location of the electrodes with respect to each other and to the electrolyte are fixed and invariable in the prior art storage batteries.

SUMMARY OF THE INVENTION

The need for battery systems continues to be an important consideration in space technologies and electric automobile applications. Improved parameters, such as higher energy density, shorter recharge time, higher amounts of stored energy, minimum hazard potential and disposal problems are enormously important. The present invention provides an innovative battery that provides unprecedented performance parameters.

All conventional batteries have associated problems including long recharge time, low energy density, hazardous chemical materials requiring special encapsulation containers and careful disposal, fixed electrode areas, and in electrical automobile applications, conventional battery systems result in limited driving distances.

An object of the present invention is to provide an improved storage battery structure wherein the electrodes are dynamically moved with respect to each other during battery operation.

Another object of the present invention is to provide an improved storage battery that can be charged during the same time that it is functioning in the discharge mode.

A further object of the present invention is to provide an improved storage battery having variable area electrodes and ratios of electrode areas that are also variable.

Still another object of the present invention is to provide an improved storage battery having separate electrodes for charging and for discharging, and wherein the number of both the charging and discharging electrodes can be varied during battery operation.

Still another object of the present invention is to provide an improved storage battery wherein the first polarity electrodes are transported past the second polarity electrodes in a continuous manner.

A still further object of the present invention is to provide an improved storage battery wherein the angular orientation between the electrodes thereof can be varied. Still another object of the present invention is to provide an improved storage battery wherein either the positive electrode, the negative electrode or both electrodes may consist of a plurality of separate electrode segments that are moved relative to each other during battery operation.

BRIEF DESCRIPTION OF THE DRAWINGS

FIG. 5 is a top view of a portion of a storage battery according to the present invention wherein a plurality of first type and a plurality of second type of electrodes are employed.

FIG. 6 is an illustration of a portion of a storage battery according to the principles of the present invention illustrating a feature wherein the orientation of the first type electrode with respect to the second type electrodes can be varied.

FIG. 7 is an illustration of a portion of an embodiment of a storage battery according to the principles of the present invention wherein one of the electrodes is a continuous strip of electrode material that is moved past the other electrode of the battery.

FIG. 10 is a schematic drawing showing the chemical reactions that occur in the battery of the present invention using a zinc-air system.

DESCRIPTION OF THE PREFERRED EMBODIMENTS

Heretofore, the concept of the physical arrangement of a storage battery has not significantly changed. It was accepted that the battery would have its structural elements fixed at the time of manufacture with the only change during its operating life being the replenishment of certain components of the electrolyte, for example by the addition of water. The demand for batteries having extremely high-energy densities (energy stored per unit of battery weight) has been increased by the need for an electrically-powered automobile for ecological and economic reasons.

Rather than continue to seek improved battery energy density in the areas of materials and chemical processes, the present invention provides a radical solution by providing a battery structure wherein the electrodes are dynamically transported past each other, and wherein the electrodes have areas and area ratios that are variable.

The battery of the present invention, which can be characterized as an instantly chargeable energy source (ICES) is uniquely different from ordinary batteries because energy is stored on a flexible electrode sheet that can be rolled up. Ordinary batteries have electrodes that are stationary.

The battery of the present invention provides electrodes that are moved during operation. Ordinary batteries have a static capacity because the surface area of the electrodes is fixed. The battery of the present invention features electrodes having areas that are both different and variable.

Figure 1:
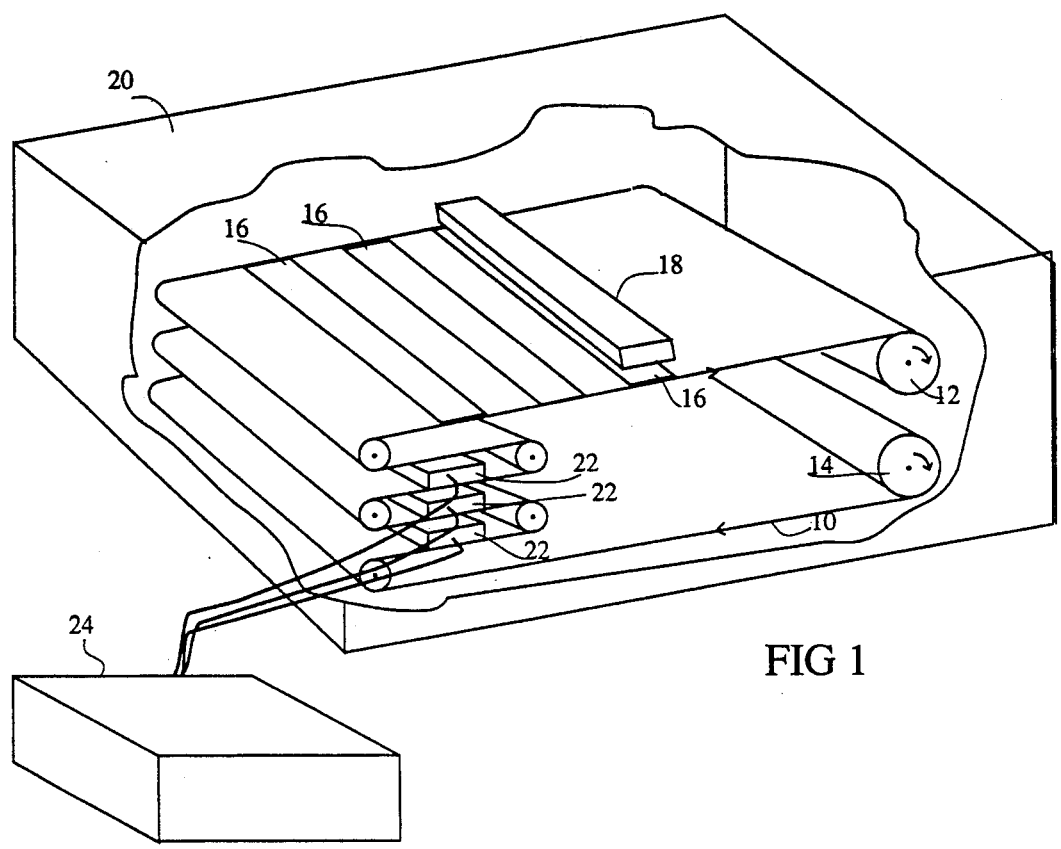
FIG. 1 is a schematic perspective illustration of one embodiment of a dynamic, variable area storage battery structure following the principles of the present invention.

Referring to FIG. 1, one embodiment of a battery structure of the present invention is illustrated including support means 10 such as a belt composed of a durable, flexible substrate material such as a single or multiple layer of conductive or non-conductive plastic or metal. Many materials that meet these criteria are commercially available. Support means 10 is moved by suitable drive means such as rollers 12 and 14. Support means 10 contains fixed thereon one or more second type electrodes 16 that move with the support means linearly past a fixed point or position. One or more first type electrodes 18 are disposed proximate to the support means 10 and are shown in a selected fixed position. The aforesaid components are disposed in a suitable container 20. An electrolyte material is also included in container 20 such that the basic units of a battery cell, two electrodes and an electrolyte, are provided. As will be described with respect to other embodiments, the electrolyte material may be localized in a much smaller size container.

One or more additional electrodes 22 are also disposed proximate to support means 10 and function as charging electrodes as will be later more fully explained. Although FIG. 1 shows support means 10 being unwound from roller 12 and rewound onto roller 14, a single drive roller in combination with a continuous belt is also possible depending on the application.

In the particular embodiment of FIG. 1, the battery operates as follows: Rollers 12 and 14 rotate clockwise and the support means 10 is moved past first type electrode 18 from left to right in the drawing. Second type electrodes 16 are transported by support means 10 past first type electrode 18. The second type electrodes 16 are spaced on the support means 10 at linear distances with respect to the surface areas of the first and second type electrodes such that as soon as one of the second type of electrodes on support means 10 begins to pass away from under the first type electrode 18, another succeeding second type electrode 16 begins to pass beneath electrode 18 so that the surface of first type electrode 18 is constantly opposite a surface of a second type electrode 16. If each of the second type electrodes on support means 10 are in a charged condition, then first type electrodes 18 each of the second type electrodes 16 proximate thereto at any given time constitute a charged storage battery cell that may be connected across an electrical load, as will be described with respect to another embodiment of the invention, the second type electrode may consist of a continuous strip of material.

In storage batteries known in the prior art, the discharge mode and the charging mode are not carried out at the same time. When a storage or secondary battery is being discharged across a load, no charging process is performed. In the development and design of battery-driven automobiles, one major consideration is the time that the automobile will be able to be driven between stopping for either battery recharging or battery replacement with a fully-charged unit. The literature does not address the concept of recharging the battery during transit at the same time that the battery is being discharged. The battery of the present invention includes the feature of simultaneously charging and discharging.

Referring again to FIG. 1, one or more third type electrodes 22 are provided in a location that the support means passes after passing the electrode 18.

After passing the electrode 18, the electrodes 16 are in a discharge condition and a charging voltage from a suitable generator source 24 is applied to the electrodes 22 such that the electrodes 16 become electrically charged as they pass proximate to the electrodes 22. The physical spacing of the one or more electrodes 22 with respect to electrodes 16 is the same as described for electrode 18 such that the electrodes 16 are continually opposite an electrode 22 surface for the charging process.

The third type electrodes 22 may be fixed within the battery structure, or may be removable, and only inserted at desired times. Classic storage battery operation requires a first type electrode surface opposite a second type electrode surface in that presence of a suitable electrolyte so that electron transfer and electrochemical action can take place for discharge or in reverse action for recharge. The present invention as embodied in FIG. 1 meets these requirements and, in addition, permits recharge simultaneously with discharge and permits variations in electrode surface areas as well as variations in the ratio of the electrodes.

The fact that the electrodes can have different size surface areas with different ratios, and the fact that separate charging electrodes are employed also permits the battery of the present invention to be recharged much more rapidly than the discharge time. It is well known that the surface areas of the electrodes of a storage battery are a factor in the charging and discharging times. Thus, if the width of the charging electrodes 22 and the width of the discharging electrodes 18 are in a ratio of 100/1, the recharge time will be 100 times faster than if this ratio was one, which is the case with all prior art batteries. For instance, if it took three hours to recharge a conventional battery, this invention will reduce the recharge time to 3 hours/100 or less than two minutes! This is a powerful feature of the present invention and very important in applications in space technology and electrically powered automobiles.

In FIG. 1, the shape of the electrodes 16, 18 and 22 are shown as rectangular that is similar to those in conventional batteries. The present invention is not limited to batteries having such rectangular electrodes, and may incorporate electrodes having circular, elliptical, trapezoidal and other such shapes as the application may require.

It is also important to note that for particular embodiments the support means 10 is not necessary in the battery combination, the second type electrode may be composed of material that does not require a support means.

FIGS. 2, 3, 4, 5, 6, 7, 8 and 9 illustrate the flexibility possible with the battery of the present invention.

Figure 2:
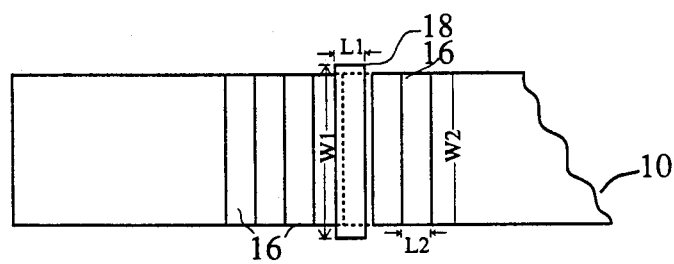
FIG. 2 and FIG. 3 are top and side views respectively of a portion of a storage battery according to the principles of the present invention showing an example of the manner in which a plurality of second type electrodes cooperate with a single first type electrode.
Figure 3:
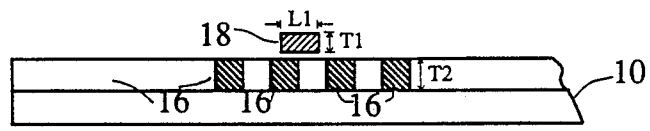
Figure 4:
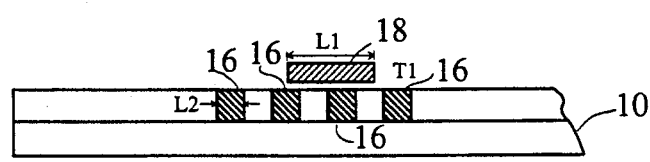
FIG. 4 is a side view of a portion of a storage battery according to the present invention wherein a first type electrode has a larger surface area than the second type electrodes.

Referring to FIG. 2, a top view of the support means 10, the electrode 18 and the electrodes 16 of FIG. 1 is illustrated wherein the length L1 and width W1 of electrode 18 is shown equal to the length L2 and width W2 of the electrodes 16 so that their areas are equal. FIG. 3 shows the side view of this embodiment. In FIG. 4 the side view of another embodiment is illustrated where the length L1 of electrode 18 is three times that of electrodes 16 so that it covers two of the electrodes 16.

Many other variations and combinations of electrodes are possible within the scope of the present invention. For example, FIG. 5 is a top view illustrating an embodiment wherein a plurality of electrodes 16 are arranged in parallel on support means 10 to cooperate with a number of separate electrodes 18 to provide a plurality of separate battery cells that may be connected to separate loads or be connected in series or parallel to a single load. Alternatively, there may be a plurality of electrodes as shown in FIG. 5 cooperating with a single electrode 18 of the type shown in FIG. 1.

FIG. 6 illustrates still another variation in which the single electrode 18 may be selectively arranged at different angles with support means 10, which in turn may be driven at different speeds.

FIG. 7 shows two other variations possible with the present invention; the second type electrodes 16 is composed of a continuous strip and the container 20 is designed to encapsulate the electrolyte only in the region immediately surrounding the two proximate electrodes. In FIG. 7 the charging electrodes 22 are not shown disposed in container 20 because it is also possible with the present invention to charge the second type electrodes at a separate location and insert them into the system when needed. This feature would be useful for electric automobile applications where, instead of transporting charging electrodes and a generating system within the automobile, fully-charged second type electrodes could be inserted at the service stations when necessary. The high charge density permitted by the battery of the present invention would allow greater distances to be traveled between charges than with ordinary batteries.

Figure 8:
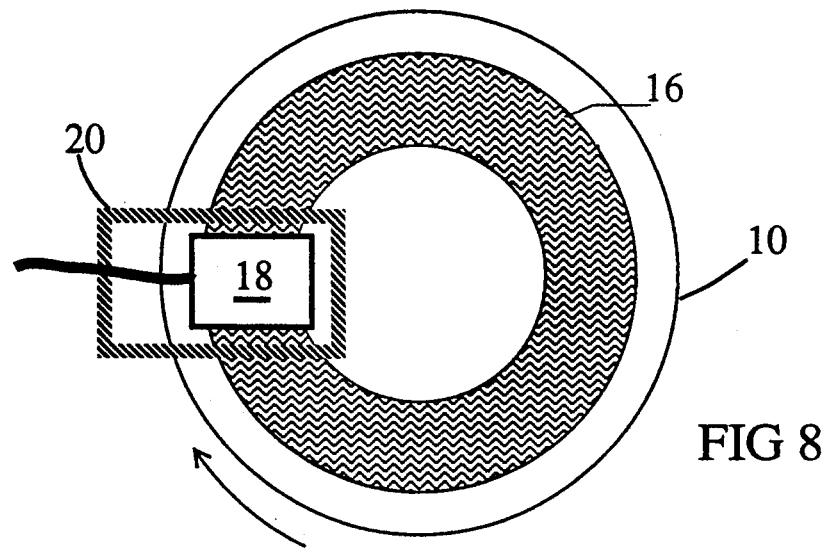
FIG. 8 is an illustration of a portion of an embodiment of a storage battery according to the principles of the present invention wherein one of the electrodes is disposed on a support surface that rotates the electrode thereon continuously past the other electrode of the battery.
Figure 9:
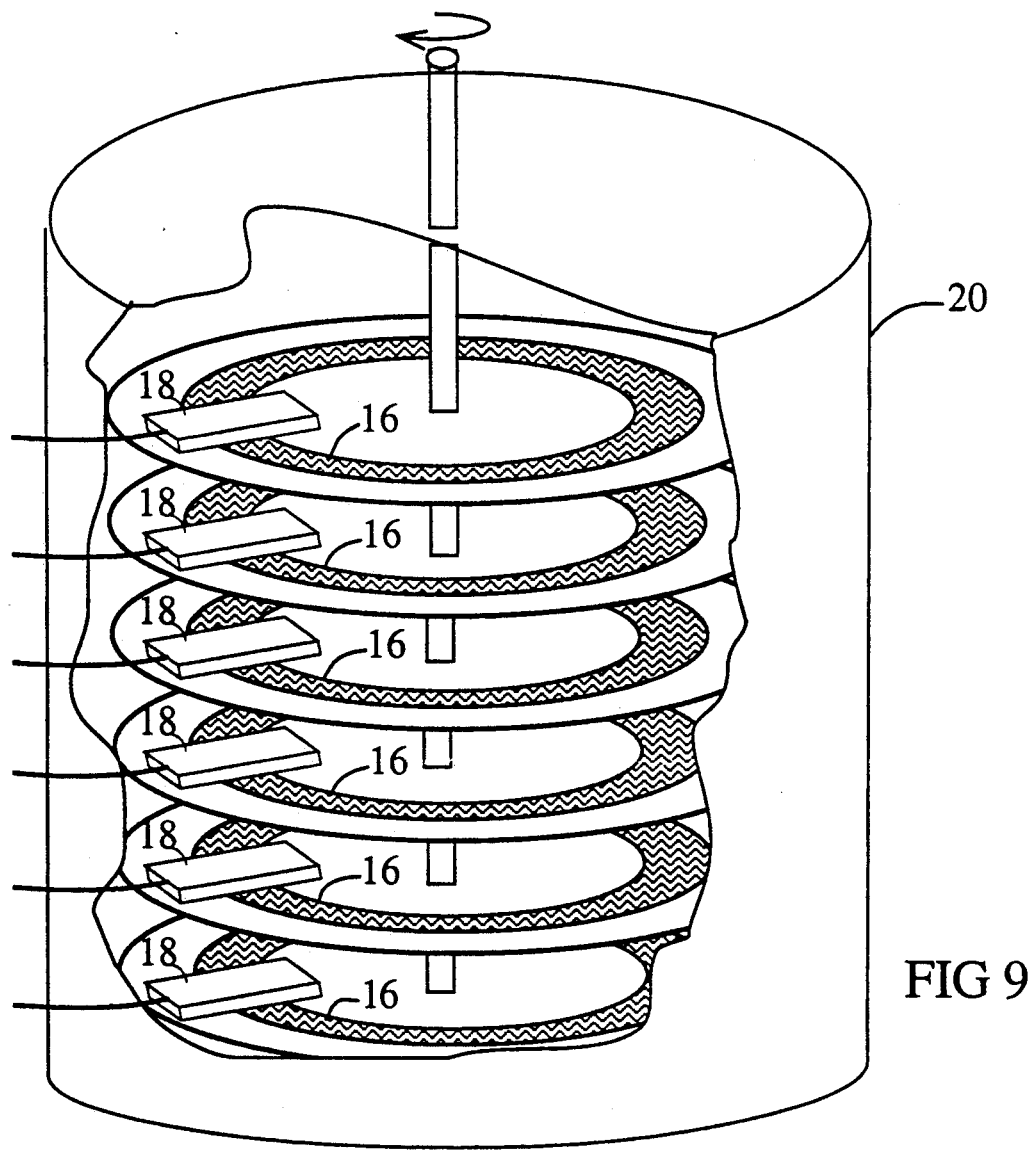
FIG. 9 is an illustration of a portion of an embodiment of a storage battery according to the principles of the present invention wherein a plurality of embodiments as shown in FIG. 8 are combined.

FIGS. 8 and 9 illustrate other configurations that the battery of the present invention can employ. The movement of one electrode with respect to the other is not limited to linear motion. In FIG. 8 the support means is circular and second type electrode 16 is disposed thereon in the form of a circular track. First type electrode 18 is positioned above the electrode 16 and the support means 10 is rotated about its axis. FIG. 9 illustrates that a plurality of structures as shown in FIG. 8 can be mounted on a common axis and rotated together to provide greater amounts of output energy.

The materials used for the electrodes and the electrolyte in the present invention may be any of those presently available and used in state-of-the-art storage batteries. For purposes of explanation of an embodiment, the battery of the present invention will be described as the rechargeable zinc-air type that uses oxygen from the air absorbed into porous carbon as a cathode (electrode 18) and zinc or a zinc alloy as the anode (electrode 16). The electrolyte is a solution of a strong base, such as potassium hydroxide. The battery produces electricity by converting zinc and oxygen into zinc oxide. When the battery is recharged, the zinc is reconstituted and oxygen is given off.

The battery of the present invention, because of its unique construction, is highly useful for many applications. A very significant applications for the battery is use within an electric-powered automobile. The fact that the battery can be recharged at the same time that it is being discharged means that frequent stops for battery recharge or battery replacement is unnecessary. Also the fact that electrodes are stored compactly on a roller for space efficiency and that electrodes having variable areas can be employed for power considerations are also valuable features for automotive applications not found in the prior art. The design details for a battery for automotive use are as follows.

The battery design parameters will be provided for a zinc-air system although the present invention is not limited to this chemistry. In addition to being efficient, zinc is non-volatile and without disposal problems.

The zinc-air chemistry used in the embodiment of the present invention is not new. Zinc-air batteries have existed for almost a century and have been used in buoys, railroad switch lamps and signal installations, mine lamps, electronic instruments and communication operations.

The theoretical energy density ratio can readily be calculated in a number of ways. The simplest is to use numbers readily available in physics textbooks which give for zinc a density of 7.13 per cc and a concentration of $6.55 \times 10^{22}$ atoms per cc. Each zinc atom will give two electrons, hence there will be $(2 \times 6.55 \times 10^{22})$ electrons for 7.13 grams of zinc. Since there are $1.6 \times 10^{19}$ coulombs per electron, then:

$$(2 \times 6.55 \times 10^{22} \times 1.6 \times 10^{19})/7.13 = 2,940 \text{ Coulomb/gram}$$

This change is available at 1.2 volts, hence the energy density in watt-hours per kilogram is:

$$2,940 \times 1.2 \times 1000/3,600 = 980 \text{ watt-hours/kilogram}$$

Commercial zinc air batteries have achieved 150 watt hours/kilogram. Two principal degradations of energy density are involved. The first is the overhead weight (the external case, the electrolyte, and the wires). The second is that only the zinc surface is involved in the chemical reaction. Therefore, either very thin sheets of zinc must be used, or a fine powder. Probably the most efficient approach is to deposit very small flake-like particles; each flake is very thin so that surface area to total weight is maximum. Assume we have such a surface about 1 mil thick (0.0025). Then the charge density is: 52.4 coulombs/cm$^2$ The zinc-air system has one of the most efficient, high-energy content, storage chemistries of present commercial batteries. The key to the relative high-energy density of the zinc-air battery is its ability to use oxygen from the air as the positive electrode reactant which need not be stored in the cell. The cells have long service life based on a high zinc capacity and the ability of the oxygen electrode to maintain steady currents at a relatively constant output voltage.

The chemistry for the zinc-air battery is shown in FIG. 10. In dilute caustic solutions the overall cell reaction is:

$$2Zn + 2H_2O = 2Zn(OH)_2 \quad E_o = 1.68 \text{ v}$$

becomes electrolyte invariant $$2Zn + O_2 = 2ZnO \quad E_o = 1.64 \text{ v}$$

Although the theoretical potential of the zinc oxygen couple is 1.67 volts, the practical operating voltage is lower. Most of this voltage loss is attributed to inefficiency in the operation of the oxygen electrode and is related to the peroxide build-up at the surface of the electrode. Practically a working voltage of 1.2 volts and a charging voltage of 2 volts are typical values.

The overall negative reaction is:

$$Zn + 2H_2O + 4e = 4 \text{ OH}$$

The cathode (oxygen electrode) in traditional cells is a porous wet-proofed carbon block matrix.

Two important parameters for the battery are the peak discharge rate and the amount of charge that can be stored on a surface area. Based on calculations and measurements these values are as:

$$I(peak) = 0.3 \text{ amperes/square cm}$$

$$Q(total) = 10 \text{ coulombs/square cm}$$

Typically, the output voltage is 1.2 volts and the discharge voltage is 2.0 volts.

Assuming no greater than 50% discharge to avoid damage, the maximum sheet velocity is calculated:

$$v(max) = \frac{I(peak)}{.5Q(total)} = \frac{.3}{.5 \times 10} = 0.06 \text{ cm/sec.}$$

This low speed will require very little energy to move the support means 10, for example by actuating the rollers in the embodiment of FIG. 1.

With a continuous zinc electrode sheet 16 having a length of 10 meters, a width of 100 cm, a thickness of 1 mil and a discharge electrode 18 1 cm wide, maximum current is $(1 \times 100 \times 0.3) = 30$ amperes at 1.2 volts or 36 watts. The total charge that is stored on the sheet is $(10,000 \times 100 \times 10) = 10000000$ coulombs. The 36 watt peak power can be sustained $$\text{for } \frac{(0.5 \times 10,000,000)}{(30 \times 3,600)} = 46.3 \text{ hours when discharge is limited to 50\%.}$$

Using an electrode 22, 100 cm wide, recharge can be carried out 100 times faster.

Employing the system outlined above, a plurality of discharge electrodes can be employed in a variety of series and parallel arrangements. A 12 volt output is obtained using 12 electrodes in series and would deliver 432 watts. Connecting the 12 electrodes in parallel will provide 360 amperes at 1.2 volts. The flexibility of replacing the electrodes in different configurations and varying the velocity of the support means makes it possible for the battery system of the present invention to be employed in a wide variety of different applications. For example, replacing or switching between discharge electrodes permits the battery to be used in an electric automobile wherein the battery may perform the same function as the transmission gears in a conventional automobile to deliver different loads depending on the situation.

When the automobile is idling (stationary) it demands the least energy, but when the automobile is accelerating or is moving uphill, it demands the highest energy. To provide for the variable demand, three-second type electrodes with binary weighted areas 1x, 2x, 4x will result in eight different currents in the order of 0, 1, 2, 1+2, 4, 1+4, 2+4, 1+2+4 that can be supplied to the load. This is the equivalent of an eight speed gear shift automotive transmission. The drawing of the eight different currents is accomplished by automatically connecting one or more of the electrodes by a simple switch arrangement. One skilled in the art will appreciate that if four second type electrodes are used, sixteen different currents are obtained, and so forth.

The fact that the battery of the present invention can employ a plurality of second type electrodes may also be used for load leveling in power plants. The battery can be combined with power generating equipment in periods of heavy load demand by adding enough extra energy to meet the demand.

Figure 11:
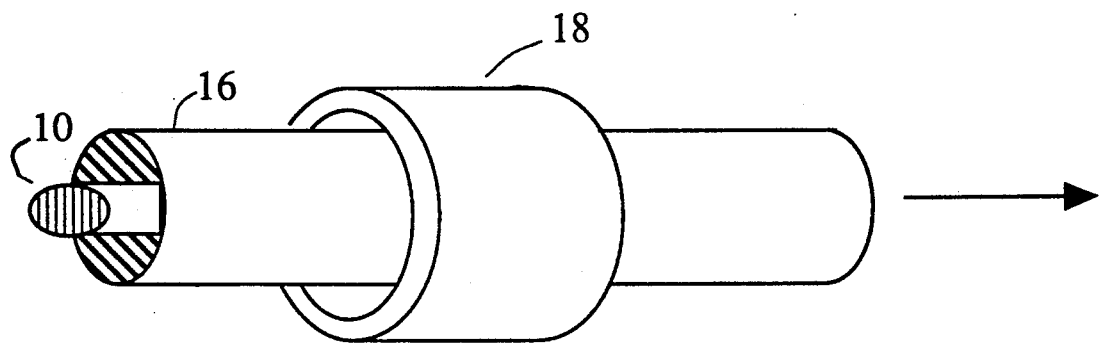
FIG. 11 is a schematic illustration of another embodiment of a battery structure according to the principles of the present invention wherein one of the electrodes is a rod substantially circular in cross-section which moves through the center of another, toroid-shaped electrode.

Another configuration of the present invention wherein one battery is moved past another electrode is shown in FIG. 11. In FIG. 11 the at least one second electrode 16 is a cylindrical rod of electrode material that may be flexible. A support means 10 is shown disposed through the center of electrode 16, however, as previously stated, support means 10 may be unnecessary and not included in the structure. The at least one first type battery electrode 18 is in the form of a toroid through which the electrode 16 is moved. As in the previous embodiment, an at least one third type charging electrode may be included in the embodiment of FIG. 11, and would also be in the form of a toroid.

Figure 12:
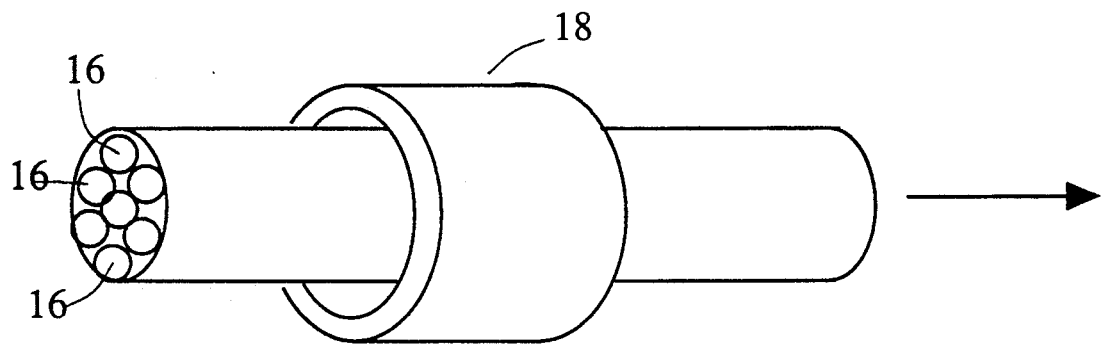
FIG. 12 is a schematic illustration of a further embodiment of a battery structure according to the principles of the present invention similar to the embodiment of FIG. 11 but wherein the one electrode is composed of a plurality of separate wires arranged in linear or twisted fashion.

In FIG. 12, instead of being composed of a solid rod of electrode material, the second type electrode 16 is composed of a plurality of separate wires bound in a bundle. The wires arranged in parallel or may be braided. The embodiment of FIG. 12 is very useful for a zinc-air battery because the oxygen is able to penetrate into the electrode and flow between the separate wires. The plurality of separate wires also provides a larger total surface area that is presented to the oxygen. The ability of the oxygen to enter into and penetrate the array of wires, and the increased surface area provided by the wires as opposed to a solid rod, results in a much more efficient battery with a high current density.

Figure 13:
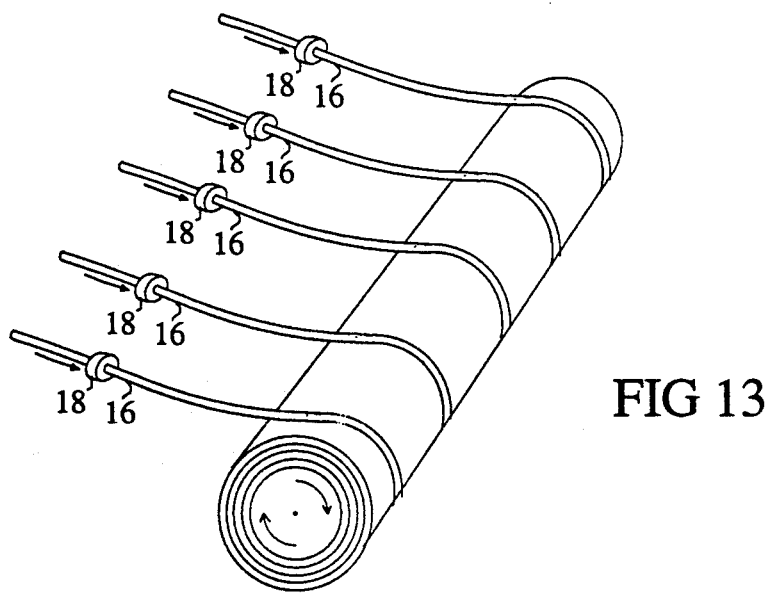
FIG. 13 is a schematic illustration of an embodiment of a battery structure wherein a plurality of battery structures as shown in FIGS. 11 or 12 are combined.

FIG. 13 illustrates that a plurality of the structures of FIG. 11 and FIG. 12 can be readily combined together to form a battery structure with a higher electrical energy output.

The second type electrode 16 may also be in the form wherein the electrode material may be powder or flakes, suspended in a suitable liquid having an appropriate viscosity. This electrode is spread on and contained on the support means 10.

What has been described is a unique storage battery incorporating movable electrodes which can have variable areas and area ratios and which provides significant operating features and advantages not obtainable with conventional storage battery structures.

While the invention has been particularly shown and described with respect to preferred embodiments thereof, it will be understood by those skilled in the art that changes in form and details may be made therein without departing from the scope and spirit of the invention.

Having thus described my invention, what I claim as new, and desire to secure by Letters Patent is:

1. A storage battery structure comprising:
    an enclosed container means;
    an electrolyte material disposed in said container means;
    at least one first type battery electrode disposed in said container means;
    at least one second type battery electrode disposed in said container means;
    means for moving said at least one second type battery electrode in a path past said at least one first type battery electrode so that a surface of said at least one second type electrode is moved proximately opposite to a surface of said at least one first type electrode, said at least one first type electrode, said at least one second type electrode and said electrolyte means forming a storage battery cell structure when said surfaces of said at least one first type and said at least one second type battery electrodes are moved past each other;
    at least one third type electrode disposed proximate to the path of said at least one second type electrode, so that a surface of said at least one second type electrode is moved proximately opposite to said surface of said at least one third type electrode;
    and a source of electrical energy connected to said at least one third type electrode wherein said at least one third type electrode functions as a charging electrode.

2. A storage battery structure according to claim 1 wherein said at least one first type electrode has a surface having a surface area A1, said at least one second type electrode has a surface having a surface area A2, said at least one third type electrode has a surface having a surface area A3, and wherein said ratio of said area A3 to area A1 is greater than one and the charging time of said battery is less than the discharging time as a function of the inverse of said ration of said area A3 to area A1.

3. A storage battery structure according to claim 1 further including at least one third type electrode disposed proximate to said to the path of at least one second type electrode, and a source of electrical energy connected to said at least one third type electrode wherein said at least one third type electrode functions to charge said at least one second type electrode proximate thereto at the same time that said at least one first type electrode functions to discharge said at least one second type electrode proximate thereto.

4. A storage battery structure according to claim 1 wherein said at least one of said first, second and third type electrodes are selectively removable from their said locations.

* * * * *